United States Patent Office 3,326,798
Patented June 20, 1967

3,326,798
DENITRIFICATION WITH CUPRIC CHLORIDE AND AN ALCOHOL
Fritz Karl Hess, Pointe Claire, Quebec, Canada, assignor to Esso Research and Engineering Company, a corporation of Delaware
No Drawing. Filed Apr. 1, 1965, Ser. No. 444,835
12 Claims. (Cl. 208—254)

This invention relates to a new and improved method of refining nitrogen-containing hydrocarbon materials. More particularly, this invention relates to the removal of nitrogen-containing compounds from petroleum distillates by treatment with alcoholic cupric chloride solution.

The presence of nitrogen compounds, such as pyrroles, pyridines, quinolines, etc. in various petroleum fractions is disadvantageous for many reasons such as color loss, organic sediment formation upon storage, catalyst poisoning on subsequent catalytic treatment, etc. Various procedures are known to the art for removing nitrogen-containing compounds; e.g. by complexing with transition metal salts. However, the latter procedure usually requires severe treating conditions with attendant high yield loss, whereas one attribute of the process of the present invention is that it is capable of operation at ambient temperature and pressure. Other nitrogen removal techniques such as acid treating, hydrofining, incorporation of additives, etc., have met with limited success and are often unsatisfactory and erratic.

In accordance with the present invention, it has been found that treatment of nitrogen-containing hydrocarbons, e.g. petroleum fractions, with an alcoholic cupric chloride solution provides highly effective nitrogen removal. Cupric chloride is a known agent in hydrocarbon sweetening processes for the removal of undesirable mercaptans present in petroleum oils and distillates, and, as disclosed in U.S. Patent No. 3,117,077, has been utilized in combination with various solvents such as dimethylformamide. Moreover, the use of aqueous cupric chloride for nitrogen removal is also known. It has now been found, however, that a very substantial improvement in nitrogen removal is obtained when the cupric chloride is in the form of an alcoholic solution thereof. The degree of nitrogen removal obtained with the alcoholic cupric chloride solution is so substantially greater than the results obtained with either the alcohol alone or an aqueous cupric chloride solution alone as to demonstrate a pronounced synergistic effect.

In general, the present process will be applicable to any hydrocarbon feedstock, the only limitation being the solubility of the particular alcohol used in the hydrocarbon to be treated. Suitable petroleum oils and distillates which may be successfully denitrified according to the present invention include petroleum crudes and fractions thereof, such as catalytic heating oils, heavy atmospheric gas oils, lube oils, middle distillates, catalytic naphthas, etc. The nitrogen content of the feedstock can range up to about 500 p.p.m. or higher, preferably up to about 200 p.p.m., basic nitrogen.

The alcohols suitable for use in the present invention should be substantially immiscible with the hydrocarbon to be treated and will include monohydroxy alcohols, preferably the aliphatic alcohols, with primary lower alcohols, e.g. $C_1$ to $C_5$ alcohols, being more preferred. Most preferred alcohols will be methanol and ethanol, with methanol being especially preferred. The particular alcohol chosen will depend upon its solubility and miscibility with the hydrocarbon feed.

The amount of cupric chloride utilized will usually be equal to its solubility in the particular alcohol at room temperature. It will be understood, of course, that lower amounts may be used. For example, up to about 20 wt. percent of cupric chloride will readily dissolve in the preferred alcohol, methanol. The amount of cupric chloride solution to be added to the nitrogen-containing hydrocarbon will depend upon both the basic nitrogen content and the degree of denitrification desired.

The nitrogen-containing feedstock is preferably contacted with the alcoholic cupric chloride solution at room temperature and atmospheric pressure. The contacting is performed in any conventional manner. For example, the nitrogen-containing feed and the alcoholic cupric chloride solution are combined and thoroughly mixed, and the mixture allowed to stand until the two immiscible layers have separated. The upper layer is then decanted and washed with water and can finally be filtered if desired.

As has been hereinbefore described, the alcoholic cupric chloride solution has proven to be a substantially better denitrification agent than the alcohol or aqueous cupric chloride alone. It will be appreciated, therefore, that the most preferred procedure will involve the use of a non-aqueous medium. However, depending upon the degree of nitrogen removal desired, small quantities of water can be tolerated in the treating medium. It will usually be unnecessary to remove the water of crystallization in the cupric chloride ($CuCl_2 \cdot 2H_2O$).

The following example is illustrative of the invention:

Example

A 20 wt. percent $CuCl_2 \cdot 2H_2O$ methanolic solution was prepared by adding 20 parts by weight of $CuCl_2 \cdot 2H_2O$ to 100 parts of methanol with stirring at ambient temperature. The copper chloride readily dissolved in the methanol to form a clear dark solution. The denitrification ability of this reagent was compared to (1) a 20 wt. percent aqueous cupric chloride solution which was similarly prepared, and (2) pure methanol. The oils tested were a light catalytic heating oil, a Guanipa heavy atmospheric gas oil and a Tia Juana heavy atmospheric gas oil. The boiling range and initial nitrogen content of these feeds are summarized in the following table. The procedure used was as follows: 20 wt. percent of the reagent (i.e. either the methanolic cupric chloride, aqueous cupric chloride, or methanol) was added to the oil and the mixture was thoroughly agitated for about one hour at room temperature. In a phase separation, the oil was withdrawn as the upper phase and subjected to a water wash and filtered to remove free water and traces of sludge. The oil layer was then analyzed for basic nitrogen content by titrating the sample with perchloric acid in a solution of glacial acetic acid. The results of these tests are summarized in the following table.

TABLE.—DENITRIFICATION WITH ALCOHOLIC CUPRIC CHLORIDE

| Feed | Boiling Range, °F. | Nitrogen Content, p.p.m. | | Percent Basic Nitrogen Reduction | | |
|---|---|---|---|---|---|---|
| | | Basic | Total | Pure Methanol | Aqueous Cupric Chloride Solution | Methanolic Cupric Chloride Solution |
| Light Catalytic Heating Oil | 450/650 | 76 | 460 | 20 | 12 | 98 |
| Guanipa HAGO | 500/710 | 101 | 229 | 10 | 2 | 81 |
| Tia Juana HAGO | 560/710 | 116 | 434 | 9 | 3 | 86 |

As indicated above, a pronounced synergistic effect is demonstrated with the use of the alcoholic cupric chloride solution. In all three cases a low degree of nitrogen reduction was obtained with both the pure methanol and the aqueous cupric chloride solution; i.e. 20% and under. With the methanolic cupric chloride solution, however, basic nitrogen reductions of over 80% were obtained. It is evident that the denitrification ability of alcoholic cupric chloride solutions may be attributed to more than the mere additive effect of the alcohol and the cupric chloride.

What is claimed is:

1. A process for removing nitrogen-containing compounds from a hydrocarbon feed which comprises contacting said feed with a solution of cupric chloride in alcohol, said alcohol being substantially immiscible with said feed.

2. The process of claim 1, wherein said alcohol is a primary alcohol.

3. The process of claim 1, wherein said alcohol is a $C_1$ to $C_5$ aliphatic alcohol.

4. The process of claim 3, wherein said alcohol is methanol.

5. A process for the removal of basic nitrogen compounds from petroleum hydrocarbons which comprises contacting said hydrocarbons with a solution of up to about 20 wt. percent of cupric chloride in methanol, and separating a hydrocarbon phase having a substantially reduced basic nitrogen content.

6. A process for reducing the nitrogen content of a petroleum hydrocarbon fraction which comprises contacting said fraction with an alcoholic cupric chloride solution and separating a hydrocarbon phase having a substantially reduced nitrogen content.

7. The process of claim 6, wherein said alcohol is a primary alcohol.

8. The process of claim 7, wherein said alcohol is methanol.

9. The process of claim 6, wherein said hydrocarbon phase is water washed.

10. The process of claim 6, wherein said fraction is a middle distillate fraction.

11. The process of claim 6, wherein said fraction is a gas oil fraction.

12. A process for removing nitrogen-containing compounds from a hydrocarbon feed which comprises contacting said feed with a solution of cupric chloride in methanol, said solution containing up to about 20 wt. percent of cupric chloride, mixing said feed and said solution, separating a treated hydrocarbon phase having a reduced nitrogen content, and water washing said treated hydrocarbon phase.

References Cited
UNITED STATES PATENTS 2,503,627 4/1950 McBride et al. _____ 208—240
2,956,012 10/1960 Mosier et al. _____ 208—296
3,126,331 3/1964 Landis et al. _____ 208—240

DELBERT E. GANTZ, *Primary Examiner.*

S. P. JONES, *Assistant Examiner.*